United States Patent
Verschuren et al.

(10) Patent No.: US 7,027,365 B2
(45) Date of Patent: Apr. 11, 2006

(54) MAGNETO-OPTICAL RECORDING FOR IMPROVED DOMAIN EXPANSION READING

(75) Inventors: Coen Adrianus Verschuren, Eindhoven (NL); Bart Van Rompaey, Eindhoven (NL); Paulus Wilhelmus Maria Blom, Zuidhorn (NL); Jeroen Jan Lambertus Horikx, Eindhoven (NL); Hans Willem Van Kesteren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 708 days.

(21) Appl. No.: 10/173,344

(22) Filed: Jun. 17, 2002

(65) Prior Publication Data
US 2002/0191497 A1    Dec. 19, 2002

(30) Foreign Application Priority Data
Jun. 18, 2001    (EP)    ............................... 01202322

(51) Int. Cl.
*G11B 11/00*    (2006.01)

(52) U.S. Cl. ............................... 369/13.09; 369/13.49; 369/275.3

(58) Field of Classification Search .............. 369/13.09, 369/13.14, 13.49, 13.17, 59.12, 116, 13.26, 369/13.27, 13.24, 275.3, 275.4, 288, 13.06, 369/13.08; 428/694 MM, 694 ML
See application file for complete search history.

(56) References Cited

U.S. PATENT DOCUMENTS

| | | | | |
|---|---|---|---|---|
| 5,991,252 A | * | 11/1999 | Kimura et al. | 369/59.12 |
| 6,314,061 B1 | | 11/2001 | Miyaoka | 369/13.17 |
| 6,809,994 B1 | * | 10/2004 | Verschuren | 369/13.26 |

FOREIGN PATENT DOCUMENTS

EP    0481786 A2    4/1992

OTHER PUBLICATIONS

Hitachi Waxell Co., "Method of Recording of Optomagnetic Recording Medium and Recording Device", Patent Application 2000-292, Jan. 5, 2000.

Patent Abstracts of Japan, Takagi Naoyuki: "Recording Method For Magneto-Optical Recording Medium and Device Therefor" Publication No. 11213473, Aug. 6, 1999, Application No. 10011340, Jan. 23, 1998.

Patent Abstracts of Japan, Miyaoka Yasuyuki: "Magneto-Optical Recording and Reproducing Method And Its Device" Publication No. 2000200450, Jul. 18, 2000, Application No. 11218906, Aug. 2, 1999.

* cited by examiner

*Primary Examiner*—Ali Neyzari
(74) *Attorney, Agent, or Firm*—Edward W. Goodman (57) ABSTRACT

The present invention relates to magneto-optical recording technique whereby improved domain expansion reading is achieved. A mark region is recorded as a sub-mark portion and an adjacent sub-space portion, wherein the length of the sub-mark portion is set to be less than or equal to the length of the sub-space portion. Stray field variations due to different runlengths of the recording data can thus be equalized even for short channel bit lengths, while the resolution and/or power margin is improved.

11 Claims, 5 Drawing Sheets

MAGNETO-OPTICAL RECORDING FOR IMPROVED DOMAIN EXPANSION READING

DESCRIPTION

The present invention relates to a method, apparatus and recording medium for recording information as a pattern of marks and spaces on a recording track. In particular, the present invention relates to a recording technique for a domain expansion system, such as a Magnetic AMplifying Magneto-Optical System (MAMMOS).

In magneto-optical storage systems, the minimum width of the recorded marks is determined by the diffraction limit, i.e. by the Numerical Aperture (NA) of the focussing lens and the laser wavelength. A reduction of the width is generally based on shorter wavelength lasers and higher NA focussing optics. During magneto-optical recording, the minimum bit length can be reduced to below the optical diffraction limit by using Laser Pulsed Magnetic Field Modulation (LP-MFM). In LP-MFM, the bit transitions are determined by the switching of the field and the temperature gradient induced by the switching of the laser. For read-out of the small crescent shaped marks recorded in this way, Magnetic Super Resolution (MSR) or Domain Expansion (DomEx) methods have to be used. These technologies are based on recording media with several magneto-static or exchange-coupled RE-TM layers. According to MSR, a read-out layer on a magneto-optical disk is arranged to copy a mark from the storage layer only in a small region of the read-out spot and mask adjacent bits during reading while, according to domain expansion, a domain in the center of a spot is expanded. Because of the advantage of the domain expansion technique over MSR, bits with a length below the diffraction limit can be detected with a similar signal-to-noise ratio (SNR) as bits with a size comparable to the diffraction limited spot. MAMMOS is a domain expansion method based on magneto-statically coupled storage and read-out layers, wherein a magnetic field modulation may be used for expansion and collapse of expanded domains in the read-out layer.

However, when long runlengths are written in a MAMMOS medium, the magnetic stray field at the center of the domain corresponding to the long runlength is weaker than at the borders thereof (in the tangential direction). At a particular "critical length" the magnetic stray field at the center of the runlength becomes insufficiently strong to generate a MAMMOS signal at that area, i.e. to obtain a copied domain in the read-out layer. This results in an erroneous bit stream. The problem can be solved by increasing the reading power of the laser, thus increasing the total temperature and thereby the local magnetic stray field of the storage layer, and at the same time decreasing the coercivity of the read-out layer. If the increase in the magnetic stray field and the decrease in coercivity are sufficient, the previously missing MAMMOS signal will be generated. However, this procedure increases the thermal copy window, which determines the resolution for read-out, such that extra false MAMMOS signals may be generated due to overlapping effects.

Document JP-A-2000-260079 suggests a MAMMOS recording system in which binary information of one bit is allotted to a magnetic section pattern constituted by a combination of two magnetic sections having magnetizations with opposite directions such that recording information that continues for two or more bits is formed in the recording layer as a series of magnetic section patterns with opposite magnetization. A homogeneous stray field is thus obtained, irrespective of the position of a respective read-out domain, even if it is located at the center of a continuous recording information. Hence, each unit of recording information can be reliably transferred to the playback layer. In particular, a mark region is recorded as a sequence of a sub-mark region having a length L1 and a subsequent short sub-space region having a length L2. The ratio L2/L1 of the length of the sub-space region to the length of the sub-mark region is suggested to be in the range of from 0.1 to 0.9. However, using the recording technique suggested in the cited prior art document, short channel bit lengths (below ≈200 nm) for high density storage still lead to a significant difference between the stray field of the short runlength and the minimum stray field at the center of a long runlength. Thus, although all MAMMOS signals of long runlengths can be obtained, the resolution is reduced.

It is, therefore, an object of the present invention to provide a method, apparatus and medium for recording on a magneto-optical medium which enable the MAMMOS reading resolution to be improved while long runlengths can be reliably detected.

This object is achieved by a recording method as claimed in claim 1, a recording apparatus as claimed in claim 10, and a recording medium as claimed in claim 13.

Accordingly, the length of the sub-mark portion of the mark region is set to be less than or equal to the length of the sub-space portion of the mark region. A suitable resolution can thus be obtained even for short channel bit lengths, so that the recording density can be further improved.

Furthermore, using a large ratio of the sub-space length to the sub-mark length, i.e. using a short sub-mark length compared to the sub-space length, provides the additional advantage that the effective length of a runlength is reduced. It is to be noted that writing a mark channel bit as a sub-mark followed by a sub-space reduces each run length at its end. As an alternative, writing such a mark channel bit as a sub-space followed by a sub-mark also works and reduces the length at the front. Thus, both approaches result in the same improvement in resolution, provided that the field timing is correctly synchronized. Thus, the resolution and/or power margin is further improved, since unwanted overlap of the stray field with the coercivity profile is suppressed.

Preferably, the ratio of the length of the second portion (sub-space portion) to the length of the first portion (sub-mark portion) is set to be less than or equal to 4. In that case sub-mark lengths of 20 nm can be written for a total channel bit length (length of total mark region) of 100 nm. Sufficiently stable sub-mark regions are thus provided at a high recording density. In particular, the ratio may be set in dependence on the length of the mark region. Thus, in the case of small channel bit lengths, the ratio L2/L1 is reduced to ensure a minimum sub-mark length required for sufficient thermal stability and stray field. A limited bandwidth of the field coil and its driver may be further reason to limit L2/L1.

Preferably, the ratio L2/L1 should be increased for each first and last mark region of a long runlength. The otherwise too large stray field of the first and last bit of long runlengths can thus be corrected. The effect thereof will depend on the channel bit length b in both cases.

Based on a given or minimum sub-mark length L1, the length of the mark region (i.e. channel bit length) b may be set according to the following equation:

$$b \geq (w + L1 + \exp)/2$$

wherein w denotes the spatial length of a copy window for copying the mark to a read-out layer by a domain expansion technique, L1 denotes the length of the first portion, and exp denotes the expansion time of the domain expansion process multiplied by the recording velocity. This equation ensures that an optimum density can be obtained at an optimum resolution and/or power margin. The domain expansion technique may be the MAMMOS technique.

The recording of the sub-space regions can be realized by switching the direction of a magnetic recording field from the first direction to the second direction before the recording laser pulse is switched off. The recording of the sub-space regions inside the mark run lengths can also be realized by appropriate switching of the direction of a magnetic recording field from the first direction to the second direction in combination with a sufficiently fast pulsing of the laser, i.e. LP-MFM.

Preferably, an integer value of L2/L1 can be used. By reversing a magnetic recording field and pulsing the laser at a frequency corresponding to the length L1, the medium is locally heated at equal distances, so that the magnetic domain is formed under substantially the same thermal conditions; this is beneficial to the quality of the recorded domains. In particular, a value of 1 is advantageous for field switching, because the same frequency can then be used during both writing and reading. Easy implementation is thus achieved.

Regarding the recording apparatus, the setting means may be arranged to set the ratio of the length of the second portion to the length of the first portion in a range of between 1 and 4.

Furthermore, the recording apparatus may be any disk player for magneto-optical disks to be read by a domain expansion technique such as MAMMOS.

Other advantageous developments are defined in the dependent claims.

These and other aspects of the invention are apparent from and will be elucidated with reference to the embodiments described hereinafter.

Figure 1:
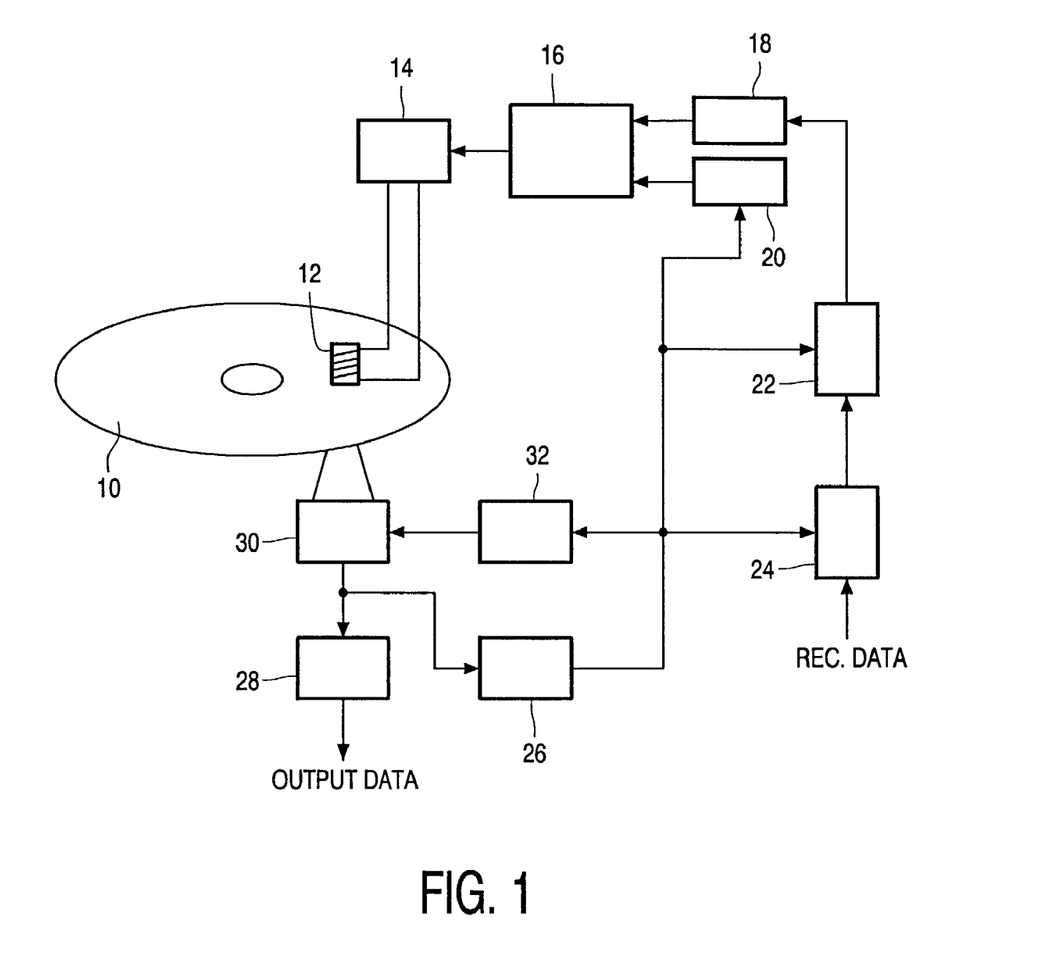
FIG. 1 shows a block diagram of a MAMMOS disk player according to the preferred embodiment.

The preferred embodiment will now be described on the basis of a MAMMOS disk player as shown in FIG. 1.

FIG. 1 shows diagrammatically the construction of the disk player. The disk player comprises an optical pick-up unit 30 having a laser light radiating section for irradiation of a magneto-optical recording medium 10, such as a magneto-optical disk, with light that has been converted, during recording, to pulses with a period synchronized with code data, and also comprises a magnetic field applying section with a magnetic head 12 which applies a magnetic field in a controlled manner at the time of recording and, if required also during playback, on the magneto-optical recording medium 10. In the optical pick-up unit 30 a laser is connected to a laser driving circuit which receives recording pulses from a recording pulse adjusting unit 32 so as to control the pulse amplitude and timing of the laser of the optical pick-up unit 30. The recording pulse adjusting circuit 32 receives a clock signal from a clock generator 26 which may comprise a PLL (Phase Locked Loop) circuit.

It is to be noted that playback may not require a magnetic field if zero field MAMMOS is used.

Furthermore, it is to be noted that, for reasons of simplicity, the magnetic head 12 and the optical pickup unit 30 are shown on opposite sides of the disk 10 in FIG. 1. However, according to the preferred embodiment they should be arranged on the same side of the disk 10.

The magnetic head 12 is connected to a head driver unit 14 and receives, at the time of recording, code-converted data from a modulator 24 via a timing adjusting circuit, such as a phase adjusting circuit 18, and a sub-mark adjusting circuit 22. The modulator 24 converts input recording data to a prescribed code, and the sub-mark adjusting circuit 22 converts each mark region of the prescribed code into a sub-mark portion or region and a sub-space region, while a predetermined length ratio of the sub-mark portion and the sub-space portion is set. It is to be noted that the sub-mark adjusting circuit 22 may as well be arranged within the modulator 24.

At the time of playback, the head driver 14 receives a clock signal via a playback adjusting circuit 20 from the clock generator 26, the playback adjusting circuit 20 generating a synchronization signal for adjusting the timing and pulse amplitude applied to the magnetic head 12. A recording/playback switch 16 is provided for switching or selecting the respective signal to be supplied to the head driver 14 at the time of recording and at the time of playback. However, this switching feature is not required for zero field MAMMOS, since in that case no magnetic field has to be applied during playback.

Furthermore, the optical pick-up unit 30 comprises a detector for detecting laser light reflected from the magneto-optical recording medium 10 and for generating a corresponding reading signal applied to a decoder 28 which is arranged to decode the reading signal so as to generate output data. Furthermore, the reading signal generated by the optical pick-up unit 30 is applied to a clock generator 26 in which a clock signal is extracted from embossed clock marks of the magneto-optical recording medium 10 and which applies the clock signal for synchronization purposes to the recording pulse adjusting circuit 32, the playback adjusting circuit 20, the sub-mark adjusting circuit 22 and the modulator 24. In particular, a data channel clock may be generated in the PLL circuit of the clock generator 26.

For recording, MFM may be used, but LP-MFM is preferable. The laser is then pulsed once for each sub-mark and (at least) once for each sub-space. A practical solution could be an integer value of the sub-space/sub-mark length ratio and pulsing the laser at a frequency corresponding to the length of the sub-mark instead of the channel bit length. In any case, the laser's duty cycle (pulse shorter than the sub-mark length) and timing (phase between magnetic field and laser pulse) should be optimized.

In the case of LP-MFM data recording, the laser of the optical pick-up unit 30 is modulated with a fixed frequency corresponding to half of the period of the data channel clock, and the data recording area or spot of the rotating magneto-optical recording medium 10 is locally heated at equal distances. It is to be noted that the recording may be improved while using a frequency corresponding to the length of the sub-mark portion (also equally spaced local heating). This will limit the length ratio to integer values so as to keep the laser pulses synchronized with the data channel clock. Another option would be to pulse the laser at distances corresponding to sub-mark and sub-space lengths of the mark regions with an optimized phase. Additionally, the data channel clock output by the clock generator 26 controls the modulator 24 and the sub-mark adjusting circuit 22 to generate a data signal with the standard clock period. The recording data is modulated and code-converted by the modulator 24 to obtain binary runlength information corresponding to the information of the recording data. In the sub-mark adjusting circuit time 20, a mark region corresponding to a channel bit of the recording information is converted to a sub-mark portion and a sub-space portion, while a space region corresponding to a channel bit is maintained. Thus, a code runlength consisting of a plurality of mark regions directly succeeding one another is converted to a number of subsequent sub-mark and sub-space regions having a predetermined length ratio. The pattern of sub-mark and sub-space portions of the code data from the sub-mark adjusting circuit 22 is forwarded to the phase adjusting circuit 18 and, after phase adjustment, forwarded to the driver 14 via the recording/playback switch 16.

The phase adjusting circuit 18 is arranged to adjust the phase in such a manner that the length L1 of a sub-mark portion of an initial mark region of a sequence of successive mark portions is reduced, while the subsequent mark regions of the runlength are maintained.

The structure of the magneto-optical recording medium 10 may correspond to the structure described in JP-A-2000-260079.

According to the preferred embodiment, the sub-mark adjusting circuit 22 is arranged to set the length L1 of the sub-mark portion to be less than or equal to the sub-space region. Each mark region thus comprises a short sub-mark portion followed by a sub-space portion having a length greater than or equal to the sub-mark portion. According to the MAMMOS domain expansion technique, the small crescent magnetic recording sections generated by the magnetic head 12 in combination with the heating effect of the pulsed laser light of the optical pick-up unit 30 can be transferred and magnified from the recording layer of the magneto-optical recording medium 10 to the read-out layer while applying a playback magnetic field and laser light. Details of the MAMMOS read-out are disclosed, for example, in "MAMMOS Read-Out with Magnetic Field Modulation", N. Takagi et al., "Proceedings of Magneto-Optical Recording International Symposium", J. Magn. Soc. Jpn., Vol. 23, Supplement, No. S1, (1999), pp. 161 to 164.

The sub-spaces have been introduced because of the fact that a difference exists in the stray fields between various domain lengths on the recording track of the magneto-optical recording medium 10. Additionally, a range of length ratios of sub-space to sub-mark which is suitable for small channel bit lengths has been developed. This range has the additional advantage that the resolution and/or power margin is further improved by an effective reduction of each runlength. For MAMMOS read-out the sum of the external field generated by the magnetic head 14 and the stray field caused by the bit pattern or domain pattern in the storage layer should be larger than the coercive field of the read-out layer. Because the stray field increases and the coercive field decreases with increasing temperature (proportional to the laser power), a minimum temperature (or laser power) is required to fulfil this condition. On the other hand, if the laser power becomes too large, the dimensions of the area where the temperature is higher than this minimum temperature are so large, that overlap with neighbouring bits will occur. This will lead to false, additional peaks and hence to a wrong number of peaks for long mark runlengths, while small spaces cannot be detected. Therefore, the laser power of the optical pick-up unit 30 should be controlled in such a way that the temperature at the center of the spot is just above the minimum temperature.

Figure 2A:
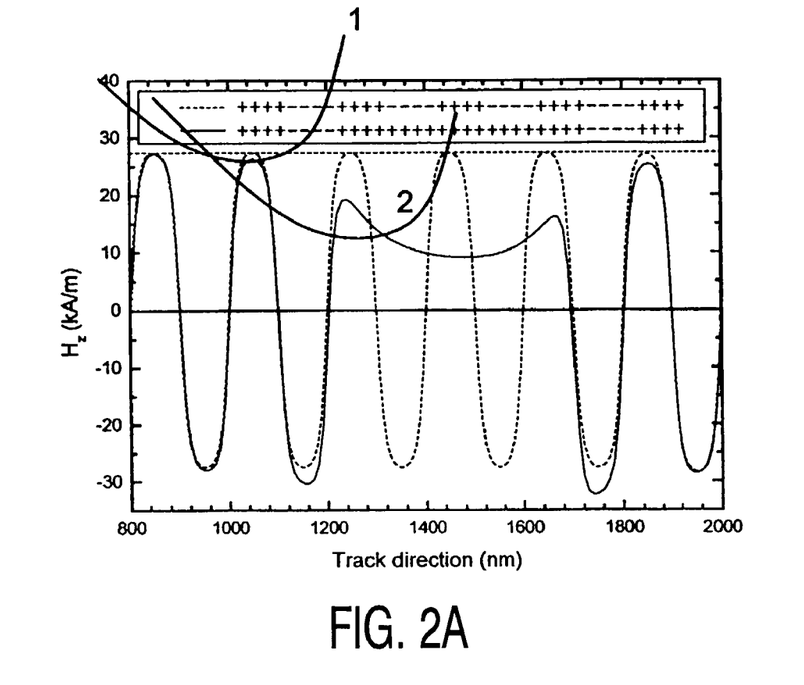
FIG. 2A shows a diagram of a stray field component perpendicular to the disk versus a track direction for short and long runlengths, and required coercive field profiles.

The stray field also depends on the length of the written domain and its surroundings. FIG. 2A shows a diagram showing a stray field versus the track direction for a channel bit length (i.e. length of a mark region of one bit) of 100 nm. The dashed line corresponds to an I1 carrier, while the solid line represents an I5 inside an I1 carrier. In general, the stray field decreases for bit lengths larger than 100 nm, especially near the center of the domain. This means that when the read-out conditions are optimized for a bit length b=100 nm, the inner area of larger domains will not show any MAMMOS signals. When using a higher read power or a larger external field to improve the read-out conditions, only the MAMMOS peaks from the center of the large domain will be missing. However, small spaces can no longer be resolved.

In FIG. 2A, the first situation corresponds to a situation where the difference between the coercive field of the read-out layer and the external field is just below 27 kA/m as indicated by the curve in FIG. 2A. In this case only the tip of the thermal profile (curve 1) is used for short domains, while longer domains with lower stray fields cannot be detected by the MAMMOS read-out. In the second situation, the difference between the coercive field of the read-out layer and the external field is around 12 kA/m in the hottest part of the spot radiated by the laser, this leads to the curve 2 in FIG. 2A. In this situation the longer domain can be detected, but the smaller space (e.g. I1 spaces) cannot be observed because the coercive field profile or thermal profile (curve 2) always overlaps with the stray field originating from neighbouring marks. Thus, in general, for optimum MAMMOS read-out with the best resolution and largest power margin, the difference between the largest value of the stray field and the lowest value among all combinations of runlengths (domain lengths) should be as small as possible.

The different thermal profiles indicated in FIG. 2A can be achieved by changing the laser power or the field strength of the magnetic head 14 during playback. It is to be noted that the example shown in FIG. 2A relates to a continuous mark region without introduction of any intermediate sub-space portions as generated by the sub-mark adjusting circuit 22.

According to the preferred embodiment, each mark channel bit (length b) is composed of two parts, that is, a sub-mark portion with a mark magnetization direction and length L1 and a sub-space portion with a non-mark (i.e. space) magnetization and length L2. Thus, the channel bit length b=L1+L2.

Figure 2B:
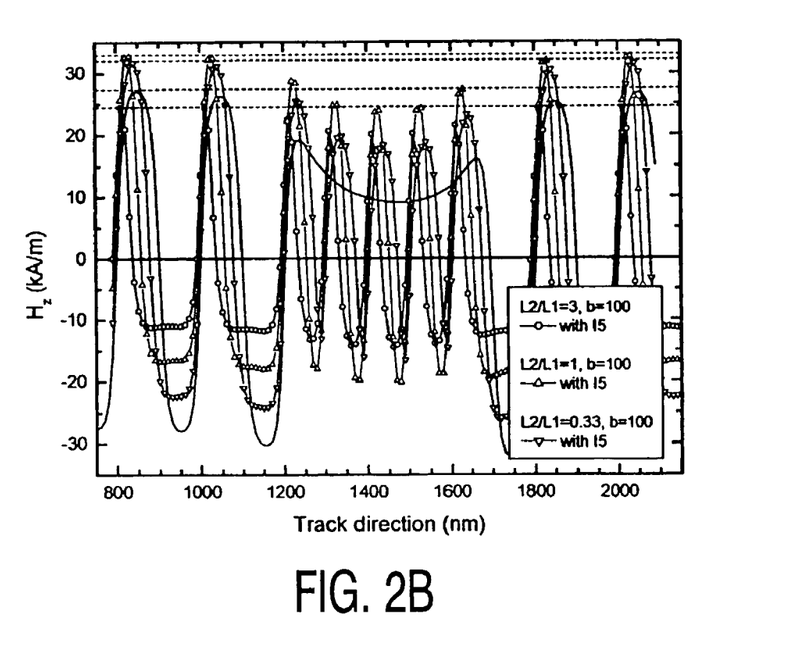
FIG. 2B shows a diagram of the stray field versus track direction for short and long runlengths and different ratios L2/L1.

FIG. 2B shows a diagram showing the stray field versus track direction for such alternating mark regions for different ratios L2/L1. The dashed threshold lines indicate the maximum stray field level of the domains (I1 carriers) for each of the selected ratios. The lines without any marking symbols represent the continuous domain (i.e. I5 carrier) shown in FIG. 2A. In particular, the down triangle symbol indicates a ratio L2/L1=0.33, the up triangle symbol indicates a ratio L2/L1=1, and the circular symbol indicates a ratio L2/L1=3. As can be gathered from FIG. 2B, larger L2/L1 ratios are more effective to increase the large runlength's stray field up to the level of the I1 carrier. However, the ratio L2/L1 should not be too large. If the sub-mark length L1 becomes too small, the stray field will decrease too much for proper MAMMOS read-out. Moreover, domain edge roughness and thermal domain stability will become important issues. It has been shown that domain lengths of 20 nm can be written and are sufficiently stable. Thus, for a channel bit length b of 100 nm, L2/L1 ratios of up to 4 should be feasible.

Figure 3:
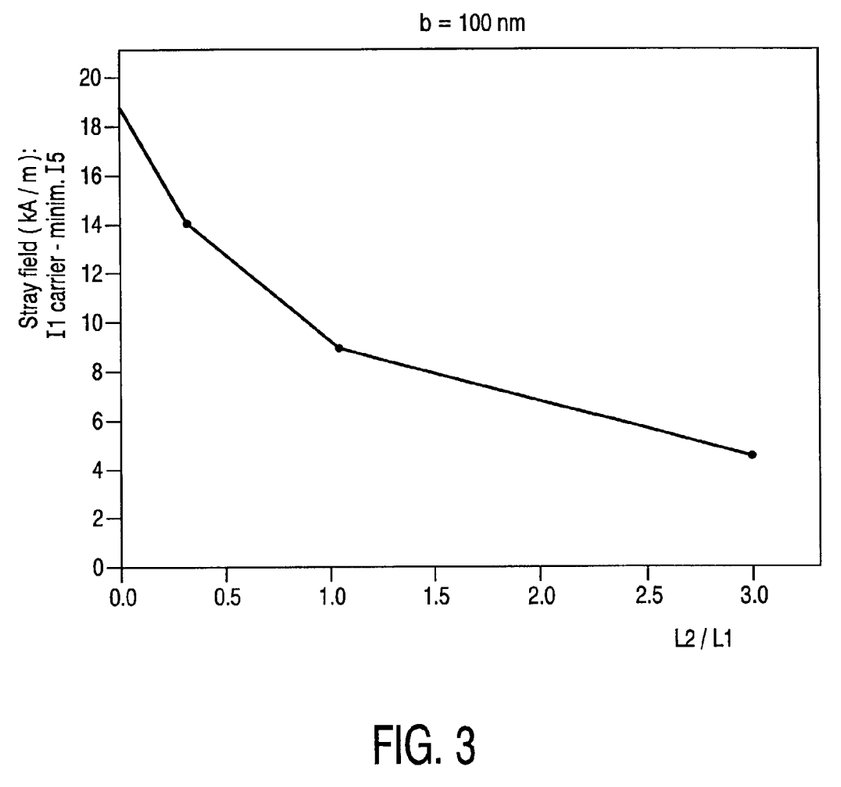
FIG. 3 shows a diagram indicating stray field differences between an I1 carrier and the minimum of an I5 carrier as a function of the ratio L2/L1.

FIG. 3 shows a diagram indicating the difference in the stray field between an I1 carrier (domain length corresponds to a bit length) and the minimum peak of a I5 carrier (domain length corresponds to 5 channel bit lengths) as a function of the ratio L2/L1 for a channel bit length of 100 nm. As can be gathered from the diagram of FIG. 3, the decrease of the stray field difference is strong up to a ratio L2/L1 of 1 and then flattens. Thus, L2/L1 preferably should be selected in a range greater than or equal to 1, i.e. the length of the sub-mark region should be less than or equal to the length of the sub-space region. In this case the stray field difference is comparatively independent of the ratio L2/L1. For practical applications in MAMMOS, i.e. very high storage densities that can compete with, for example, advanced phase change techniques, channel bit lengths of 100 nm and smaller are required. Therefore, in the case of a minimum sub-mark length L1 of around 20 nm, the range of the ratio L2/L1 should be selected between 4 (for b=100 nm) and 1 (for b=40 nm).

An additional advantage of using a large L2/L1 ratio is that due to the long subspace length the effective length of a runlength is reduced at its end. In this way, the resolution and/or power margin is further improved, because unwanted overlap of the stray field with the coercive profile (during non-mark/space read-out) is suppressed.

Figure 4A:
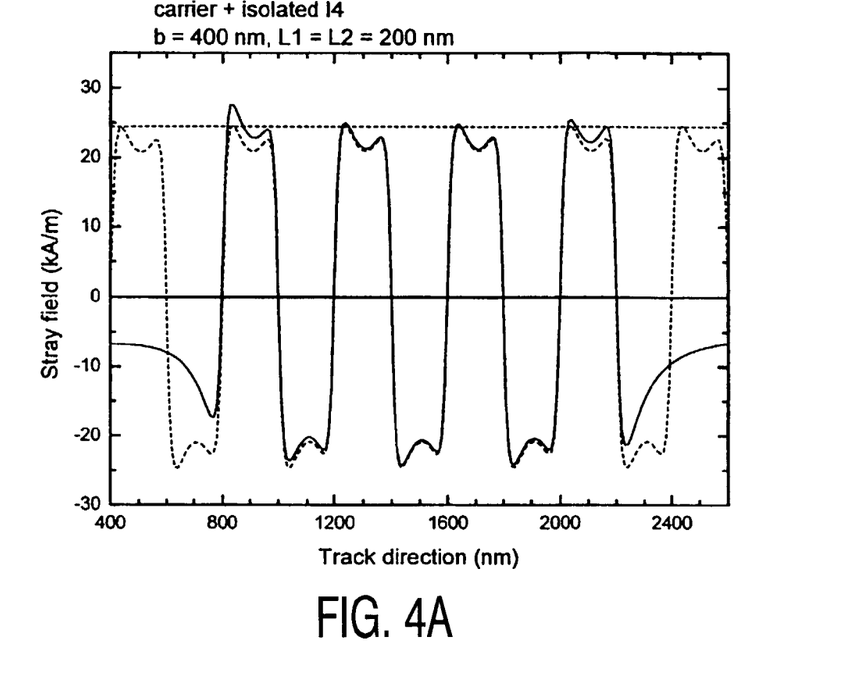
FIGS. 4A to 4D show stray fields of an I4 carrier and an I1 carrier for different bit lengths.
Figure 4B:
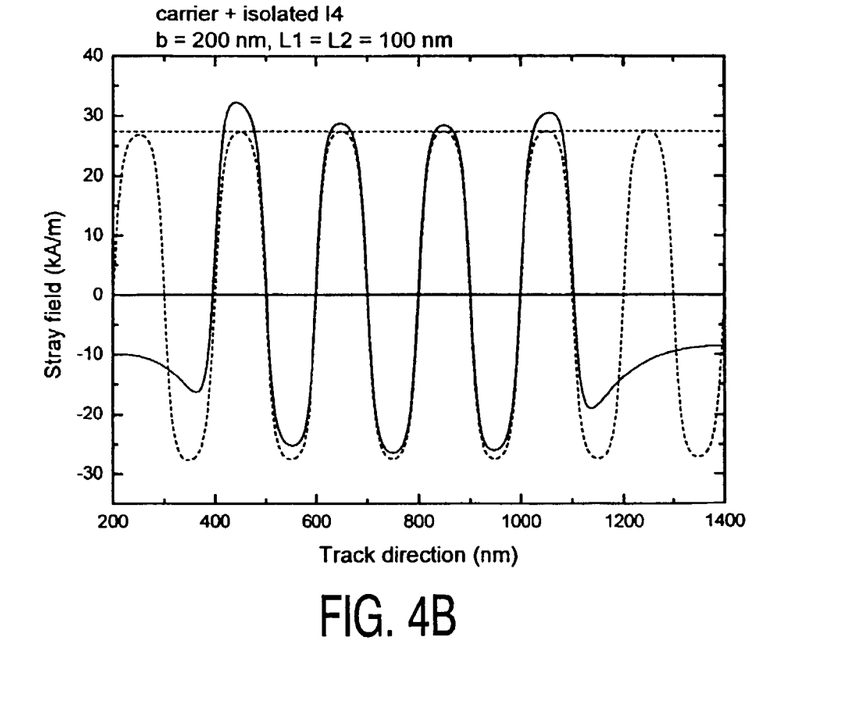
Figure 4C:
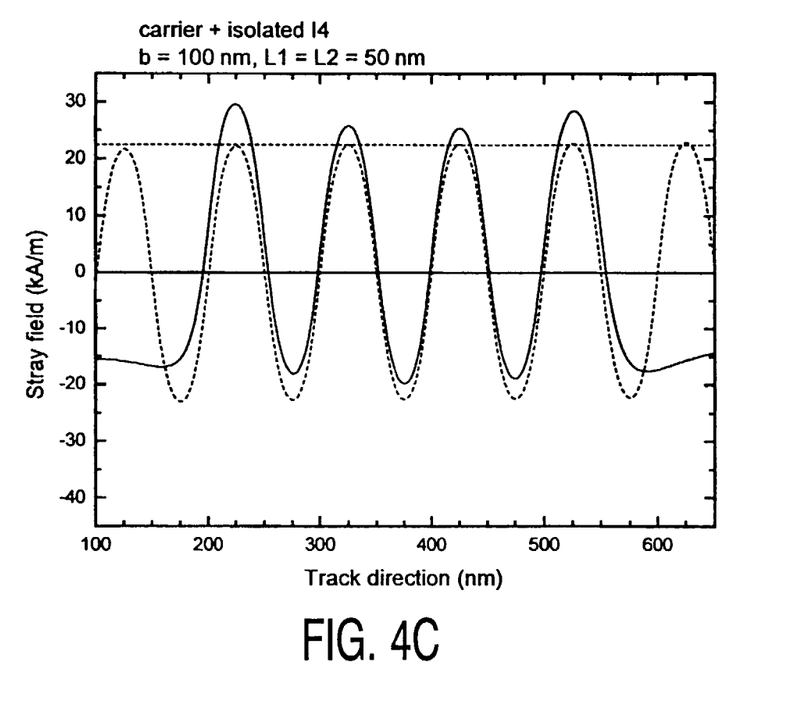
Figure 4D:
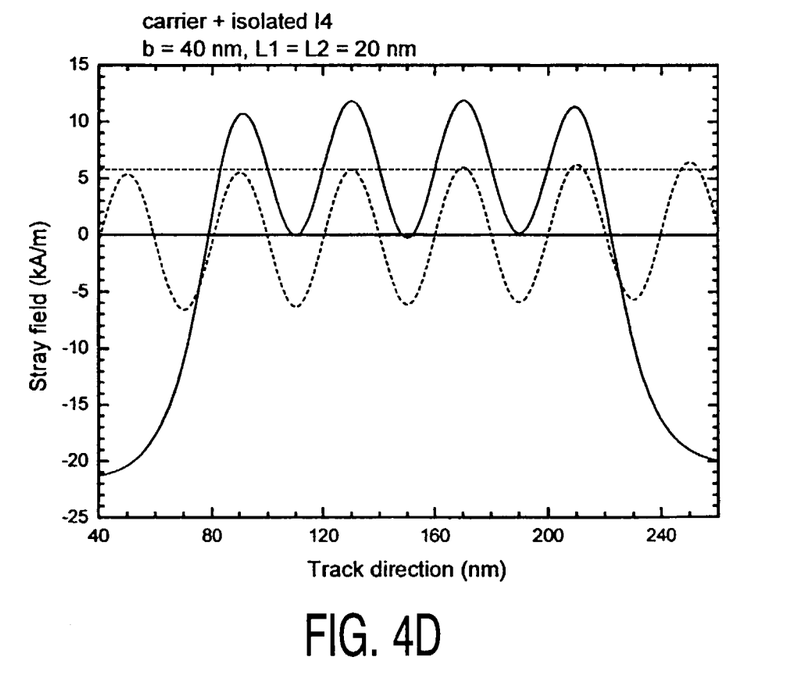

FIGS. 4A to 4D show stray fields for an isolated alternating domain of an I4 runlength (domain length corresponds to 4 channel bit lengths) and an I1 carrier (dashed) for different channel bit lengths b, the ratio L2/L1 having been set to 1 in all situations. In FIG. 4A the channel bit length b equals 400 nm, in FIG. 4B the channel bit length b equals 200 nm, in FIG. 4C the channel bit length b equals 100 nm, and in FIG. 4D the channel bit length b equals 40 nm. As can be gathered from the FIGS. 4A and 4B, the write strategy is very effective for b 200 nm and b=400 nm. The fact that the stray field of the first bit on the left side in the I4 runlength is larger can be corrected by using a slightly larger L2/L1 ratio (shorter sub-mark portion) for each first bit in a long runlength. This adjustment can be performed in the phase adjusting circuit 18 or in the sub-mark adjusting circuit 22. Even in the case of small channel bit lengths, such as 40 nm, a sufficient stray field difference can be obtained to ensure detection of both I4 and I1 carriers.

It is to be noted that the disk structure of the magneto-optical recording medium 10, underlying the calculations of the above figures, was assumed to have a storage layer thickness of 50 nm and a read-out layer thickness of 20 nm, separated by a 5 nm $SiN_x$ layer. The compensation temperature is around room temperature for both magneto-optical layers, whereas the Curie temperatures are 320° C. and 270° C. for the read-out layer and the storage layer, respectively.

A rule for optimizing the size distribution of the channel bit length b and the length L1 of the sub-mark portion is given hereinafter.

The resolution of the read-out is determined by the spatial size w of the copy window which corresponds to the length of the area where the temperature is high enough to enable the domain expansion copy process. Thus, the size w of the copy window depends on the laser power and the external magnetic field. To obtain a proper resolution of an I1 carrier, the size w of the copy window w should be less than or equal to half of the channel bit length b. Applying this rule to a write strategy with asymmetric sub-marks, where L1+L2=b, the maximum allowed window is given by:

$$w_{max}=b+L2-\exp=2b-L1-\exp,$$

wherein exp denotes the expansion time of the domain expansion effect (multiplied by the velocity of the magneto-optical recording medium 10 so as to obtain a corresponding length). The expansion time corresponds in particular to the time during which a bit from the recording layer can be nucleated and expanded into the read-out layer. Based on the above equation, a minimum channel bit length or maximum recording density can be calculated if the sub-mark length L1 is given, or vice versa, according to the following equation:

$$b_{min}=(w+L1+\exp)/2.$$

From this equation it will be clear that the sub-mark portion L1 as well as the expansion time exp should be as small as possible for an optimum resolution and/or power margin. However, as indicated above, a minimum sub-mark length L1 of 20 nm has been determined.

For example, in the case of a copy window w=55 nm as obtained while employing a numerical aperture NA=0.60, a 660 nm laser, a disk velocity of 1 m/s, a sub-mark length L1=25 nm, and an expansion time exp=10 ns×1 m/s=10 nm, a minimum channel bit length of 45 nm can be achieved.

As already mentioned, the ratio L2/L1 can be set in the modulator 24 or in the separate sub-mark adjusting circuit 22 indicated in FIG. 1. The generation of the sub-mark portion and the sub-space portion based on a continuous mark region can be realized by way of any switching operation of an analog or digital timer circuit or pulse generator. In particular, a mark region may be recorded either as a sub-mark followed by a sub-space or as a sub-space followed by a sub-mark.

It is to be noted, that the present invention is not restricted to the above preferred embodiment and can be applied to any magneto-optical recording process so as to reduce stray field variations and to increase the read-out resolution.

What is claimed is:

1. A method of recording information as a pattern of marks and spaces on a recording track of a magneto-optical recording medium, said method comprising the steps of:
    a) writing a mark by having a sub-mark portion of a mark region of said magneto-optical recording medium magnetized in a first direction substantially perpendicular to the recording surface of said recording medium and by having an adjacent sub-space portion of said mark region magnetized in a second direction which opposes said first direction;
    b) setting the length (L1) of said sub-mark portion of said mark region so as to be less than or equal to the length (L2) of said adjacent sub-space portion of said mark region in the direction of said recording track; and
    c) setting a ratio of said length (L2) of said sub-space portion to said length (L1) of said sub-mark portion to an integer value less than or equal to 4
    wherein the length of said mark region is determined on the basis of the following equation:

$$b \geq (w+L1+\exp)/2,$$

wherein w denotes the spatial length of a copy window for copying said mark to a read-out layer by a domain expansion technique, L1 denotes said length of said sub-mark portion, and exp denotes the time during which a bit from a recording layer can be nucleated and expanded into said read-out layer multiplied by the recording velocity.

2. A method as claimed in claim 1,
wherein said ratio of said length (L2) of said sub-space portion to said length (L1) of said sub-mark portion is set to 1.

3. A method as claimed in claim 1,
wherein said ratio is set in dependence on the length (b) of said mark region.

4. A method as claimed in claim 1,
wherein said ratio is increased for each first or last mark region of a long runlength.

5. A method as claimed in claim 1,
wherein said domain expansion technique is a MAMMOS technique.

6. The method as claimed in claim 1, wherein said method further comprises the step of:
switching the direction of a magnetic recording field from said first direction to said second direction before a recording laser pulse is switched off.

7. The method as claimed in claim 1, wherein said method further comprises the steps of:
switching the direction of a magnetic recording field from said first direction to said second direction; and
pulsing a recording laser at a frequency corresponding to said length of said sub-mark portion.

8. A recording apparatus for recording information as a pattern of marks and spaces on a recording track of a magneto-optical recording medium, said apparatus comprising:
a) writing means for writing a mark by having a sub-mark portion of a mark region of said magneto-optical recording medium magnetized in a first direction substantially perpendicular to the recording surface of said recording medium and by having an adjacent sub-space portion of said mark region magnetized in a second direction which opposes said first direction; and
b) setting means for setting the length (L1) of said sub-mark portion of said mark region so as to be less than or equal to the length (L2) of said sub-space portion of said mark region in the direction of said recording track, said setting means also setting a ratio of said length (L2) of said sub-space portion to said length (L1) of said sub-mark portion to an integer value less than or equal to 4 wherein a length of said mark region is determined on the basis of the following equation:

$$b \geq (w + L1 + \exp)/2,$$

wherein w denotes the spatial length of a copy window for copying said mark to a read-out layer by a domain expansion technique, L1 denotes said length of said sub-mark portion, and exp denotes the time during which a bit from a recording layer can be nucleated and expanded into said read-out layer multiplied by the recording velocity.

9. An apparatus as claimed in claim 8,
wherein said recording apparatus is a disk player for a magneto-optical disk to be read by a domain expansion technique.

10. A magneto-optical recording medium on which information is recorded on a recording track as a pattern of marks and spaces, wherein a mark region comprises a sub-mark portion magnetized in a first direction substantially perpendicular to the recording surface of said recording medium and a sub-space portion magnetized in a second direction which opposes said first direction, and wherein the length (L1) of said sub-mark portion is less than or equal to the length of said sub-space portion in the direction of said recording track, wherein a ratio of said length (L2) of said sub-space portion to said length (L1) of said sub-mark portion to an integer value less than or equal to 4, and wherein a length of said mark region is determined on the basis of the following equation:

$$b \geq (w + L1 + \exp)/2,$$

where w denotes the spatial length of a copy window for copying said mark to a read-out layer by a domain expansion technique, L1 denotes said length of said sub-mark portion, and exp denotes the time during which a bit from a recording layer can be nucleated and expanded into said read-out layer multiplied by the recording velocity.

11. The magneto-optical recording medium as claimed in claim 10,
wherein said magneto-optical recording medium is a magneto-optical disk to be read by a domain expansion technique.

* * * * *